April 18, 1967 L. WESCH 3,315,259
CAMOUFLAGING NET INCLUDING A RESONANCE ABSORBER
FOR ELECTROMAGNETIC WAVES
Filed Feb. 2, 1961 4 Sheets-Sheet 3
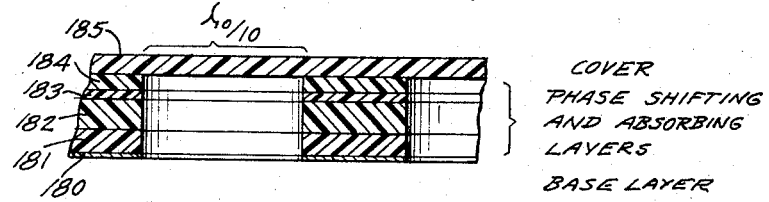
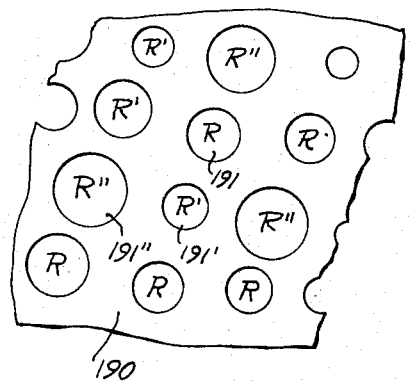
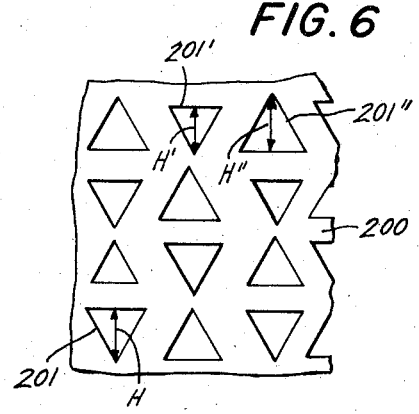
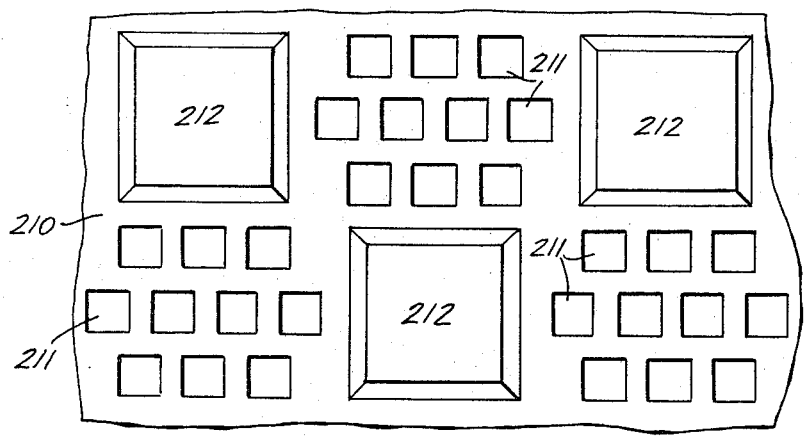
INVENTOR.
LUDWIG WESCH
BY 
AGENT

3,315,259
CAMOUFLAGING NET INCLUDING A RESONANCE ABSORBER FOR ELECTROMAGNETIC WAVES
Ludwig Wesch, Heidelberg, Germany, assignor to Eltro GmbH & Company, Gesellschaft fur Strahlungstechnik, Heidelberg, Germany
Filed Feb. 2, 1961, Ser. No. 86,823
7 Claims. (Cl. 343—18)

This is a continuation-in-part of my applications Ser. No. 611,406, filed Sept. 11, 1956, Ser. No. 709,140, filed Jan. 15, 1958, and Ser. No. 14,154, filed Mar. 10, 1960, the latter having been substituted for my applications Ser. Nos. 611,401 and 611,403, both filed Sept. 11, 1956, all now abandoned.

The present invention relates to a camouflaging net including a resonance absorber for impinging electromagnet waves having wavelengths in free space between about 1 cm. and 20 cm.

As is known, a resonance absorber comprises a wave reflecting base layer and an absorber wall superimposed on the base layer, the absorber wall having a partially reflective outer surface whereon the electromagnetic waves are to be impinged and whereon one part of the impinging wave beam is reflected, the other part of the impinging wave beam penetrating into the absorber wall and being reflected by the base layer.

Frequently, targets must be camouflaged against such impinging electromagnetic waves in a manner permitting light to penetrate, for instance in the case of artillery positions or the like. For such purposes, nets are conventionally used since they camouflage without shutting out light.

It is accordingly an object of the present invention to provide a camouflaging net which very strongly reduces the reflection of the electromagnetic waves in a very wide frequency band but with a very thin absorber wall, the net being useful for camouflaging different objects completely independently of the reflection of their surfaces, without noticeably impairing the clear view of persons or reducing the visual capacity of optical instruments arranged under the net, and the net being of such material that it may easily be spread over the object to be camouflaged.

It is a more specific object of this invention to provide a resonance absorber for such a camouflaging net, which satisfies the following Equations II and III for a sufficiently wide frequency band in the radar range.

In the resonance absorber used in the present invention, the absorber wall applied to the reflecting base layer has a predetermined high relative dielectric constant and a high relative magnetic permeability. The product of the two parameters of the entire absorber wall is greater than 3, preferably greater than 6, its thickness is less than $\lambda_0/7$ and is defined by equation $$h = \frac{(2n-1)\lambda_0}{4\sqrt{k' k_m'}} \tag{I}$$

wherein $n$ is any integer, $k'$ is the relative dielectric constant, $k_m'$ is the relative magnetic permeability and $\lambda_0$ is the wavelength in free space.

In order to obtain wave extinction over a broad frequency band a material has to be used whose high-frequency constants $k'$ and $k_m'$ satisfy the equation $$\sqrt{k' \cdot k_m'} = \text{const } \lambda_0^x \tag{II}$$

$x$ is a correction factor without dimension compensating the tolerable deviations of the extinction of the radiation.

Since the thickness $h$ is always constant, $k' \cdot k_m'$ varies according to the square of the wavelength. However, considering a remaining reflection of 20 to 30% tolerable, a variation of $\lambda_{ox}$ is sufficient, $x$ being a positive exponent of less than 2, for example, between 1.2 to 1.8. With the variation of $k' \cdot k_m'$ in dependency on the wavelength, the losses also change so that the following final equation is obtained:

$$\tan \delta_d fy(\lambda) + \tan \delta_m fy(\lambda) = \frac{4}{\pi} \cot h^{-1} \sqrt{\frac{k' fy(\lambda)}{k_m' fy(\lambda)}} \tag{III}$$

wherein $fy(\lambda)$ is a function of the wavelength so that Equation III is satisfied for all wavelengths in the frequency band.

I have found that it is not possible to adapt the absorber device to a wide frequency band if it consists of only one absorber layer, even if a thin spacing layer is provided between the absorber layer and the reflecting base layer. But this can be achieved according to my invention, by constructing a wall of at least two films each of which is compounded of a material with a predetermined dielectric constant and a predetermined permeability with such a thickness relative to the thickness of the whole wall that the above mentioned Formula III is satisfied for a wide frequency band.

Laminates in which the residual reflection of all waves of a wide frequency band is below an amplitude of 30% may be regarded as suitable for practical purposes.

These films each having high-frequency characteristics different from other films may be arranged in a suitable sequence. Preferably, they are arranged in such a manner that the high-frequency constants $k'$, $k_m'$, $\tan \delta_d$ and $\tan \delta_m$ of the laminate increase inwardly towards the reflecting base layer.

The absorber wall films may be applied to a support sheet, which may be the reflecting base layer, by brushing or spraying or the like, or they may, for example, include a thermoplastic resin and possibly a vulcanizable material. A plurality of such films may be laminated in a suitable manner before being applied to said support sheet e.g. by means of an adhesive.

The reflecting base layer on the rear face of the sheet may be a foil or a net of any suitable metal and be bonded by means of adhesives to the preformed laminate, or it can be a suitable metallic powder compounded with a lacquer which is applied to the lower sheet face of the preformed laminate by spraying, brushing or puttying.

In accordance with a further feature of the invention, wave reflection may be substantially reduced by giving the surface of the absorber wall a particular configuration which substantially promotes the scattering and/or diffraction and/or multiple reflection of the waves.

A spatial network or lattice preferably of regular form but also of irregular form is provided on the surface exposed to impinging radiation to provide a three-dimensional surface with rectangular, square or circular recesses or projections with sides of predetermined depth and angles of slope, so that the reflection from the front face is substantially reduced.

The surface may be designed, for example, in the form of small truncated pyramids, or in the form of a honeycomb pattern or in the form of a number of small truncated cones the bases of which are in contact.

The thickness $h$ of the absorber wall is then such that $$W_n \cong W_p \tag{IV}$$

wherein $W_n$ = the weight per square inch of the absorber wall having a spatial network, and $W_p$ = the weight per square inch of an absorber wall having a plane surface and the thickness $h$, $\cong$ means about equal.

My present invention will be further understood from the following description in connection with the accompanying drawings showing certain embodiments which in no way limit the present invention. In the drawings, FIG. 1 is a diagram showing the reflection of two layers of different materials as well as the reflection of an absorber wall consisting of the two layers;

FIG. 4 is a vertical section of a camouflaging net according to the invention;

FIG. 5 is a top view showing a portion of a camouflaging net constructed according to FIG. 4, with a modified version of net apertures;

FIG. 6 is similar to FIG. 5 with a different type of net apertures.

FIG. 7 is similar to FIGS. 5 and 6, with the net apertures forming a surface network.

Figure 1:
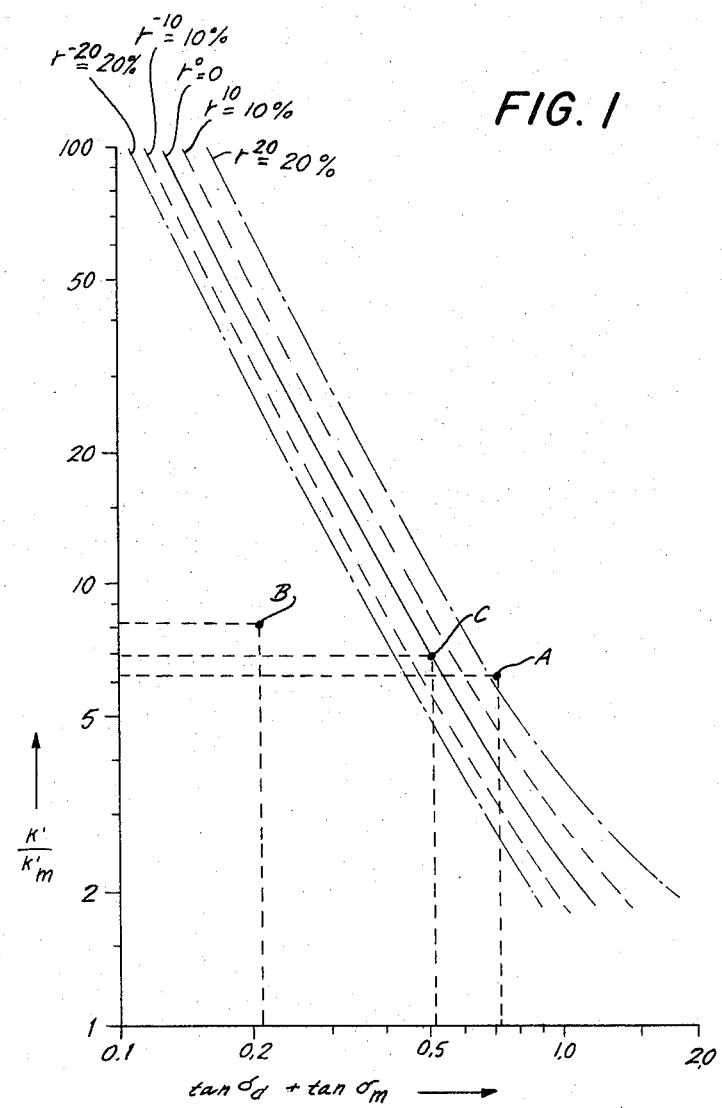

The absorber films consist of a suitable dielectric binder material, for instance natural or synthetic rubber, organic plastics or the like, embedding a granular filler material which controls the relative magnetic permeability and the relative dielectric constant, which are designated as the high-frequency characteristics, of the layers. In addition to the above-named binder materials, mortar, concrete, bitumen, cardboard and other dielectric materials have been found useful for the purpose, the only requirement being that the binder materials have a relative dielectric constant between 1.5 and 10 and a dielectric loss tangent smaller than 0.1.

The granular additives or fillers embedded in the binder material include, singly or in combination, high-frequency iron powders having a grain size of 0.1 to 100μ, preferably 1 to 5μ. The term "high-frequency iron powders," as used throughout the specification and the claims, includes all ferromagnetic bodies of the indicated grain size and having high-frequency characteristics to make them effective in the desired wave range, for instance ferromagnetic materials reduced from carbonyls, iron powders which are reduced with hydrogen, magnetites and such bodies which are produced by the partial or complete decomposition of other iron compounds. It includes particularly the class of ferrites, the iron being partially displaceable by nickel, zinc, manganese, etc. See also "Radio Engineering Handbook," Keith Henney, 4th ed., 1950, New York, p. 129.

For some purposes, it is preferred to use iron powder fillers of good conductivity, i.e. having a high dielectric constant, in my absorber films. For instance, the iron powder filler may be produced from iron pentacarbonyl in a known manner.

Such iron powders have the desired properties regarding grain size, conductivity and permeability. However, iron salts, particularly iron oxalate, may also be useful for the purpose of the invention. Ferriferrous oxide ($Fe_3O_4$) obtained by the decomposition of iron salts or recovered by some other known chemical process may also be used as high-frequency iron powder, as well as γ-ferric oxide ($Fe_2O_3$) prepared by the conversion of magnetite or any other known chemical process.

In addition, ferrites may also be used as additives or fillers. The term "ferrites" is used through the specification and claims to designate magnetite which may be obtained by decomposition of iron oxalate or a normal ferrite in which the iron oxide is substituted by an oxide of nickel, zinc, manganese, a rare earth metal or an earth alkali metal, such as barium.

Other additives or fillers useful in the invention are graphite, titanium dioxide and titanates, such as barium titanate, and the like, and the fillers described in my copending application Ser. No. 86,824, filed simultaneously herewith.

The additives or fillers may be present in an amount of 2.5% to 90% by weight, based on the total weight of the film.

The high-frequency losses and characteristics of each absorber film are measured by means of known arrangements, such as described, for instance, in Arthur R. v. Hippel's work, "Dielectric Materials and Applications," The Technology Press of M.I.T. and John Wiley & Sons, Inc., New York, 1954, pp. 47 to 146. After selection of suitable materials the number of the films in the laminate and the thickness of each film relative to the total thickness of the laminate will be determined and the laminate will be measured as a whole as mentioned above. The results of the measurements for different wavelengths are inserted in Equation III. If both sides of the equation are about equal, the films are suitable for use. If the equation III is too unbalanced for a desired absorption, the filler materials and/or amounts of one or more films must be changed to obtain the desired high-frequency characteristics, whereupon the measurements are repeated until the Equation III is satisfied.

The amplitude of the partial beam reflected at the boundary surface of the absorber may also be reduced and thus matched with the amplitude of the partial beam emerging from the absorber, and strongly attenuated therein, by imparting to the absorber wall surface such a configuration that a given portion of the impinging waves is scattered.

Figure 3:
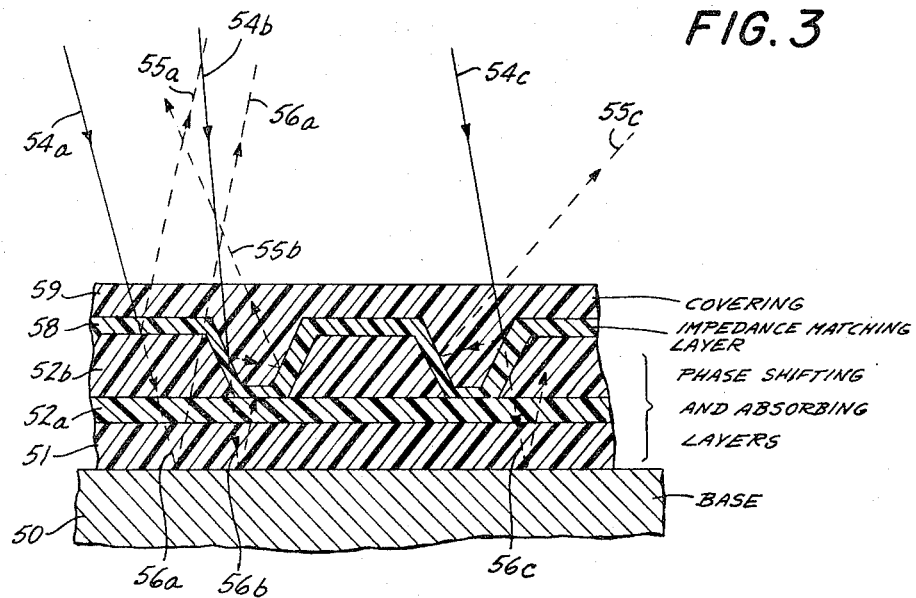
FIG. 3 is a vertical section of an absorber laminate with a surface network of recesses having the form of truncated cones.

One such surface configuration is shown in FIG. 3 wherein an absorber laminate 41 is mounted on reflecting base 40. The absorber surface is in the shape of a waffle-type network with rows of truncated pyramids P defining rows of recesses W therebetween. A network of this type may be simply formed by pressing.

Figure 2:
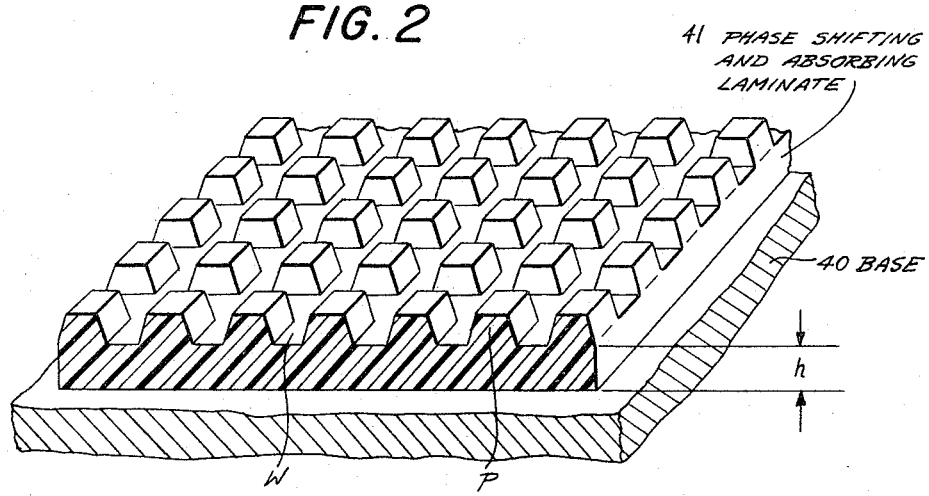
FIG. 2 is a perspective view of an absorber laminate with a pyramidal surface network.

The vertical section of FIG. 3 shows the effect of such a network, the only difference between the embodiments of FIGS. 2 and 3 being that the protuberances are frusto-cones instead of truncated pyramids. The effects of both embodiments are substantially the same and will now be described in connection with FIG. 3, the absorber wall structure being similar to that of FIG. 2 and having two films 52a and 52b.

The metallic reflecting base 50 carries the phase-shifting film 51 whereon, wave absorber layer 52a, 52b and impedance matching layer 58 are superposed to form the laminate. The impinging wave 54a is partly reflected as partial beam 55a and the other partial beam 56a penetrates into the laminate (which meets or approaches the conditions of Equation III), where its phase is shifted so that it is opposite to the phase of partial beam 55a and its amplitude is decreased so that it is equal to the amplitude of partial beam 55a.

Beam 54b impinging upon oblique side wall of the absorber surface penetrates only to a small extent into the absorber laminate where the partial beam 56b is reflected from base 50. The larger part of the impinging wave 54b is reflected from the boundary surface toward the adjacent oblique wall of the surface and the partial beam 55b is then reflected in a direction opposite to the direction of the impinging wave, as shown, i.e. in the direction where the receiver for the reflected radar waves is usually located and positioned at a predetermined angle. Therefore, these laterally deflected waves 55b will not be received by the conventionally positioned radar receiver.

FIG. 3 illustrates the path of a further wave 54c which impinges upon an oblique wall of the absorber surface which is inclined oppositely to the inclination of the wall which is hit by wave 54b. The wave path is similar, with the partial beam 56c penetrating into the laminate and being reflected in a direction opposite to the direction of the impinging wave.

The impedance matching layer 58 fulfills the conventional function of such layers, and damage to the absorber laminate may be avoided by providing a protective layer 59 which also has the function of giving the entire structure a smooth surface. The protective layer material fills the recesses of the absorber surface and consists of any suitable material with the smallest possible high-frequency losses and desirable mechanical properties. If camouflaging against visual or infrared wave detection is desired, the protective layer 59 may be suitably pigmented.

It will be obvious to the skilled in the art that the described surface configurations designed to reduce measurable reflection at the boundary surface of the absorber laminate may be used in conjunction with any type of such absorber laminates. Also, layers 58 and 59 may be combined into a single layer which has the required impedance matching characteristics and mechanical properties.

The radar camouflage net of the present invention has net aperture diameters of $\lambda_0/5$ to $\lambda_0/10$ and the area formed by the apertures forms up to 40% of the entire absorber surface.

FIG. 4 shows a vertical section of a camouflaging net consisting of the following films:

Layer 180 is the reflecting base which may be any metallic foil or metallic lacquer containing a metallic powder, for instance aluminum bronze, which may be sprayed or brushed onto the rear side of the laminate.
Layer 181 is a 1.5 mm. pellicle of polyisobutylene.
Layer 182 is a 2 mm. film of the following composition (all parts by weight):
600 parts of polyvinylchloride.
300 parts of toluene isobutyl and toluene ethyl sulfonamide (plasticizer).
800 parts of a high-frequency iron having a grain size of 5 to 10μ.
100 parts polybutadiene.
1 part paraffin 42° C.
5 parts ZnO.
1.2 parts S.

This mixture is vulcanized to give the desired film which is then cemented to the layer 181.

Layer 183 is an 0.5 mm. pellicle of polyisobutylene containing 2% carbon black.

Layer 184 is a 2 mm. film of a butadiene-acrylonitrile copolymer containing 75% of high-frequency magnetite of a grain size of 0.1 to 2μ.

Layer 185 is a cover layer of polyisobutylene containing 3% ZnO and having a thickness of 0.4 to 1 mm.

The absorber net is shown to have apertures of a diameter of 1/10 the wavelength of the waves to be absorbed. All the layers of the laminate are bonded together by suitable adhesives or cements or vulcanized together, if desired.

FIG. 5 is a top view of such a camouflaging net 190 showing circular apertures 191, 191′ and 191″ with varying diameters R, R′ and R″. The total area covered by the apertures is about 35% of the surface of the net and their average diameter is about $\lambda_0/7$, the diameters of adjacent apertures varying to enable better matching to a broad band. For instance, if the net is to be used to protect against radiation with an average wavelength of 3.2 cm., the diameter R=4.57 mm., R′=4.5 mm. and R″=4.65 mm.

The camouflaging net 200 of FIG. 6 is of similar laminated structure but has apertures 201, 201′ and 201″ in the form of equilateral triangles which cover 40% of the total net surface. The average height of the triangles is about $\lambda_0/10$ and to adapt the net to a frequency band with an average wavelength of 5.5 cm., H=5.5 mm., H′=5.3 mm. and H″=5.7 mm.

If it is desired to make the net very light in weight and, therefore, very thin, the impedance in the boundary surface may be so large that the partial beam reflected therefrom is considerably more powerful than the partial beam penetrating into the laminate and being reflected from its base. In this case, it will be advantageous to impart to the surface of the net a configuration designed to scatter some of the surface reflection.

FIG. 7 is a top view of a camouflaging net 210 with groups of square apertures 211 separated by truncated pyramids 212 forming protruding surface portions. Tuned to an average wavelength of 3.2 cm., the base of the pyramids should have a length of 16 mm. and the pyramids should have a height of 5.1 mm., with an inclination of their side walls of 45°. The largest of the apertures 211 is $\lambda_0/8$ and scatters about this value. Their sides have a length of 4 mm., the smallest apertures have side lengths of 3.9 mm. and the largest ones have side lengths of 4.1 mm. The apertures cover a total of about 20% of the net surface including the pyramids.

Figure 8:
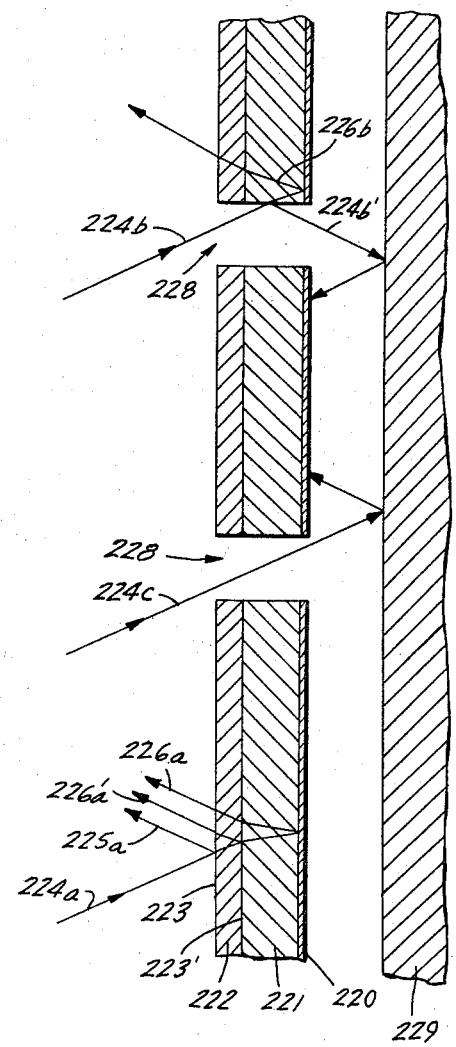
FIG. 8 is a vertical section of a camouflaging net and the object to be camouflaged thereby, with the wave paths schematically indicated.

FIG. 8 illustrates a camouflaging net applied to an object 229. The net is composed of a reflecting base 220, and absorptive and phase-shifting films 221 and 222. The net has apertures 228, as generally described in connection with FIGS. 4–7. The distance of the net from object 229 may be regular or irregular although, for simplicity's sake, the net is shown to be parallel to the surface of the object to be protected from detection by radar waves. The illustrated effect of the net is, however, totally independent of the distance of the net from the object.

An impinging wave 224a will be reflected and absorbed, the partial beam 225a being reflected from the boundary surface 223 while another partial beam 226a′ of the beam portion penetrating the laminate will be reflected from boundary face 223′, the remainder of this beam portion being reflected from the base and leaving the laminate as partial beam 226a. As heretofore explained, all the reflected beams are brought into interference and cancel each other.

Another impinging wave 224b hits a side wall of an aperture 228, causing the major portion thereof to be reflected as partial beam 224b′ toward the object 229 whence it is reflected to the reflecting base of the net and thus absorbed between the object and this base. A smaller partial beam 226b penetrates into the laminate and is reflected from base 220 where it interferes with parts of the beams 225a and 226a, as well as 226a′, thus being cancelled.

Finally, the impinging wave 224c passing completely through an aperture 228 to the object 229 is reflected back and forth between base 220 and the object, as described in connection with partial beam 224b′, the oscillating beams interfering with each other to cause eventual extinction.

It will be obvious to the skilled in the art that I have found a practically almost unlimited variety of electromagnetic wave absorbers which can be readily adapted to meet, or closely approach, the conditions of Equation III, thus producing broadband absorbers of superior quality. In accordance with my invention, this is accomplished by using laminates of non-homogenous films of dielectric binder materials containing fillers designed to vary the high-frequency characteristics, i.e. the relative dielectric constant, the relative magnetic permeability, the dielectric loss tangent and the magnetic loss tangent, of the films. By using suitable dielectric materials, suitable fillers and suitable film combinations, the conditions of Equation III may be closely approached while the thickness of the laminate is small compared to the thickness of conventional absorbers, i.e. always smaller than a quarter-wavelength. At the same time, the laminates may have desirable mechanical properties to make them useful for a variety of applications, as herein illustrated. Finally, surface impedance matching and/or wave scattering means may be used further to increase the absorptive effectiveness of the laminates.

While I have thus described and illustrated a number of preferred embodiments of the present invention, it will

What I claim is:

1. A camouflaging net for absorbing impinging electromagnetic waves having wavelengths in free space between about 1 cm. and 20 cm., comprising a flexible laminated sheet defining apertures, the apertures occupying up to 40% of the sheet area and the average width of the apertures being one-fifth to one-tenth of the wavelength of the waves to be absorbed, the sheet including (1) a wave reflecting base layer and (2) an absorber wall superimposed on the base layer, the absorber wall having a partially reflective outer surface whereon the electromagnetic waves are to be impinged and whereon one part of the impinging waves is reflected, the other part of the impinging waves penetrating into the absorber wall and being reflected by the base layer, the absorber wall consisting of a plurality of absorptive films and having a thickness $h$ of less than $\lambda_0/7$ and defined by equation $$h = \frac{(2n-1)\lambda_0}{4\sqrt{k' k_m'}} \quad (I)$$

wherein $n$ is any positive integer, $\lambda_0$ is the wavelength, $k'$ is the relative dielectric constant of the absorber wall material and $k_m'$ is the relative magnetic permeability of the absorber wall material, and $k' k_m'$ is greater than 3, each absorptive film consisting of a dielectric binder containing at least one granular filler controlling the high frequency characteristics $k'$, $k_m'$, $\tan \delta_d$ and $\tan \delta_m$, $\tan \delta_d$ and $\tan \delta_m$ being the dielectric and magnetic loss tangents, respectively, the filler being present in each film in such an amount and having such a grain size and form that their high frequency characteristics vary in dependence on the wavelength and the entire absorber wall satisfies the equation $$\sqrt{k' k_m'} = \underline{\text{const}}\ \lambda_0 x \quad (II)$$

wherein $\underline{\text{const}}$ is a constant equal to $(1/4h)^2$ and the exponent $x$ is a dimensionless correction factor compensating for tolerable deviations from full wave absorption, the amount and composition of the filler in each film being such that the high frequency characteristics of the absorber wall are determined by the equation $$\tan \delta_d fy(\lambda) + \tan \delta_m fy(\lambda) = \frac{4}{\pi} \coth^{-1} \sqrt{\frac{k' fy(\lambda)}{k_m' fy(\lambda)}} \quad (III)$$

wherein $fy(\lambda)$ is a function of the dependency of the high frequency characteristics on the wavelength so as to satisfy the latter equations for all of said wavelengths, and $\coth^{-1}$ is the inverse hyperbolic cotangent.

2. The camouflaging net of claim 1, wherein the values of the high frequency characteristics of the absorptive films vary so that the product of $k'$ and $k_m'$ for the absorber wall increases with the wavelength of the impinging waves at such a rate that, throughout a substantial wavelength band having a width of no less than 25% of the lower limit of the band, the total reflection of the net is such that the reflected wave amplitude is less than 30% of the impinging wave amplitude.

3. The camouflaging net of claim 1, wherein the filler in at least one of the absorptive films includes conductive material and the filler in another one of the absorptive films includes magnetic material.

4. The camouflaging net of claim 1, wherein the product of $k'$ and $k_m'$ is greater than 6 and the thickness of the absorber wall is less than 1/10th of the wavelength.

5. The camouflaging net of claim 1, wherein the surface of the absorber wall has a configuration of a spatial network scattering such a portion of the one wave part that the amplitudes of both wave parts are substantially equal, the thickness $h$ of the absorber wall being such that $$W_n \cong W_p \quad (IV)$$

wherein $W_n$ is the weight per square inch of the absorber wall having a spatial network, and $W_p$ is the weight per square inch of an absorber wall having a plane surface and the thickness $h$.

6. The camouflaging net of claim 5, wherein the surface is waffle-like and forms a plurality of truncated pyramids.

7. The camouflaging net of claim 5, wherein the surface defines a plurality of truncated conical recesses.

References Cited by the Examiner

UNITED STATES PATENTS

| | | | |
|---|---|---|---|
| 2,148,526 | 2/1939 | Brillhart | 117—104 |
| 2,875,435 | 2/1959 | McMillan | 343—18 |
| 2,923,934 | 2/1960 | Halpern | 343—18 |
| 2,940,874 | 6/1960 | Barnes | 117—104 |
| 2,948,639 | 8/1960 | Price | 117—104 |
| 2,951,247 | 8/1960 | Halpern et al. | 343—18 |
| 2,964,444 | 12/1960 | Lynn | 156—309 |
| 2,992,425 | 7/1961 | Pratt | 343—18 |
| 3,026,228 | 3/1962 | Robinson et al. | 156—309 |
| 3,026,229 | 3/1962 | Wilcox | 156—309 |

RODNEY D. BENNETT, *Primary Examiner.*

CHESTER L. JUSTUS, LEWIS H. MYERS, *Examiners.*

C. F. ROBERTS, J. P. MORRIS, B. L. RIBANDO,
*Assistant Examiners.*